US012628114B2

(12) United States Patent
Li

(10) Patent No.: US 12,628,114 B2
(45) Date of Patent: May 12, 2026

(54) POSITIONING METHOD

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 520 days.

(21) Appl. No.: 18/013,897

(22) PCT Filed: Jul. 1, 2020

(86) PCT No.: PCT/CN2020/099779
§ 371 (c)(1),
(2) Date: Dec. 29, 2022

(87) PCT Pub. No.: WO2022/000380
PCT Pub. Date: Jan. 6, 2022

(65) Prior Publication Data
US 2023/0292281 A1    Sep. 14, 2023

(51) Int. Cl.
*H04W 64/00* (2009.01)
*H04L 5/00* (2006.01)
*H04W 74/0833* (2024.01)
*H04W 74/0836* (2024.01)

(52) U.S. Cl.
CPC ......... *H04W 64/003* (2013.01); *H04L 5/0048* (2013.01); *H04W 74/0833* (2013.01); *H04W 74/0836* (2024.01)

(58) Field of Classification Search
CPC ........... H04W 64/003; H04W 74/0833; H04W 74/0836; H04W 64/00; H04L 5/0048; H04L 5/0035; H04L 5/005; H04L 5/0053; G01S 5/0205
See application file for complete search history.

(56) References Cited

U.S. PATENT DOCUMENTS

| | | |
|---|---|---|
| 2012/0094691 A1 | 4/2012 | Chen et al. |
| 2012/0134288 A1 | 5/2012 | Fang et al. |
| 2017/0273108 A1 | 9/2017 | Damnjanovic et al. |

(Continued)

FOREIGN PATENT DOCUMENTS

| | | |
|---|---|---|
| CN | 101883423 A | 11/2010 |
| CN | 102307387 A | 1/2012 |

(Continued)

OTHER PUBLICATIONS

INOA of Application No. 202347004844 dated on Jun. 2, 2022 with English translation,(12p).

(Continued)

*Primary Examiner* — Kabir A Timory
(74) *Attorney, Agent, or Firm* — Arch & Lake LLP; Hao Tan; Shen Wang

(57) ABSTRACT
A positioning method is applied in a terminal device. The positioning method includes: receiving a plurality of synchronization signal blocks; determining a plurality of positioning random access resources corresponding to the plurality of synchronization signal blocks, wherein the positioning random access resources are random access resources for positioning; and sending at least one positioning reference signal according to the plurality of positioning random access resources.

16 Claims, 5 Drawing Sheets

(56) References Cited

U.S. PATENT DOCUMENTS

| | | | |
|---|---|---|---|
| 2018/0020423 A1 | 1/2018 | Wang et al. | |
| 2019/0364599 A1 | 11/2019 | Islam et al. | |
| 2020/0245200 A1* | 7/2020 | Xiong | H04W 76/11 |
| 2020/0383147 A1* | 12/2020 | Yoon | H04L 27/2607 |
| 2021/0368538 A1* | 11/2021 | Yerramalli | H04W 76/11 |
| 2024/0259150 A1* | 8/2024 | Cha | H04W 74/0833 |

FOREIGN PATENT DOCUMENTS

| | | | |
|---|---|---|---|
| CN | 109156039 A | 1/2019 | |
| CN | 111294787 A | 6/2020 | |
| WO | 2018034607 A1 | 2/2018 | |

OTHER PUBLICATIONS

CNOA of Application No. 202080001435.1 dated on Nov. 1, 2021 with English translation,(14p).

Search Report for EP application No. 20942673.3 dated Mar. 11, 2024, (11p).

International Search Report of PCT/CN2020/099779 dated Mar. 19, 2021, (4p).

\* cited by examiner

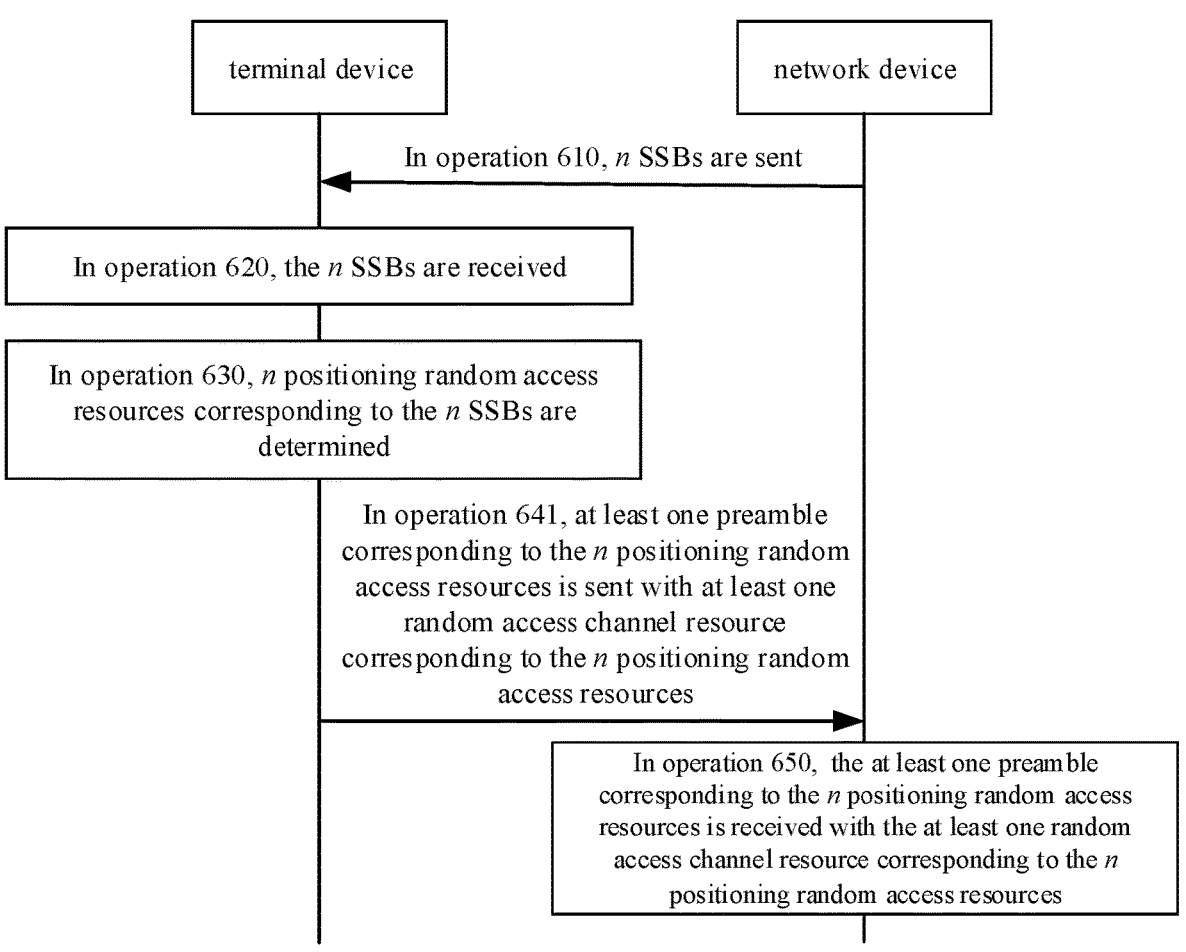

In operation 610, $n$ SSBs are sent

In operation 620, the $n$ SSBs are received

In operation 630, $n$ positioning random access resources corresponding to the $n$ SSBs are determined In operation 641, at least one preamble corresponding to the $n$ positioning random access resources is sent with at least one random access channel resource corresponding to the $n$ positioning random access resources In operation 650, the at least one preamble corresponding to the $n$ positioning random access resources is received with the at least one random access channel resource corresponding to the $n$ positioning random access resources

FIG. 7

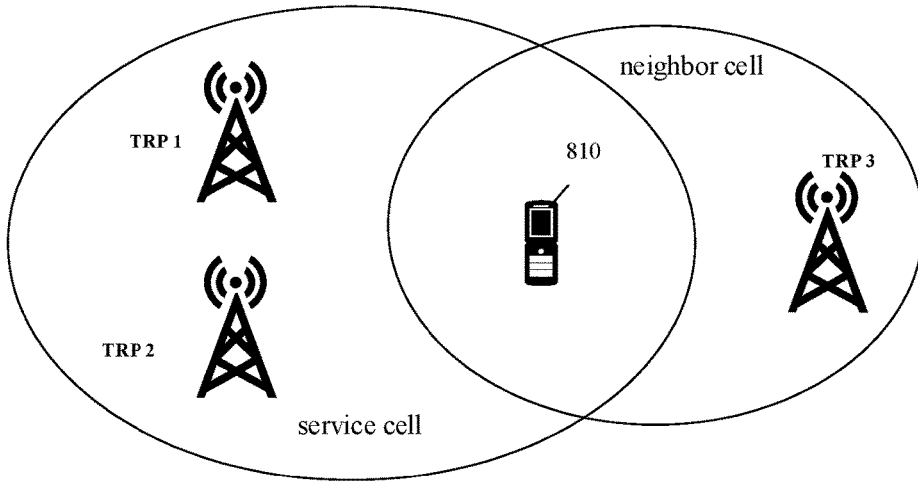

FIG. 8

POSITIONING METHOD

CROSS-REFERENCE TO RELATED APPLICATIONS

The present application is a National Stage of International Application No. PCT/CN2020/099779, filed on Jul. 1, 2020, the contents of all of which are incorporated herein by reference in their entireties for all purposes.

TECHNICAL FIELD

The present disclosure relates to the field of communication technologies, and provides a positioning method.

BACKGROUND

In order to identify their own locations, terminal devices need to be positioned.

SUMMARY

According to a first aspect of the present disclosure, a positioning method is provided. The method includes: receiving a plurality of synchronization signal blocks; determining a plurality of positioning random access resources corresponding to the plurality of synchronization signal blocks, in which the positioning random access resources are random access resources for positioning; and sending at least one positioning reference signal according to the plurality of positioning random access resources.

According to a second aspect of the present disclosure, a positioning method is provided. The method includes: sending a plurality of synchronization signal blocks to a terminal device. The plurality of synchronization signal blocks are provided for the terminal device to determine a plurality of positioning random access resources, and the positioning random access resources are random access resources for positioning.

According to a third aspect of the present disclosure, a terminal device is provided, the terminal device includes: a processor; a transceiver connected to the processor; and a memory for storing instructions executable by the processor. The processor is configured to load and execute the executable instructions to implement the positioning method as described in the first aspect.

According to a fourth aspect of the present disclosure, a network device is provided. The network device includes: a processor; a transceiver connected to the processor; and a memory for storing instructions executable by the processor. The processor is configured to load and execute the executable instructions to implement the positioning method as described in the second aspect.

According to a fifth aspect of the present disclosure, a non-transitory computer-readable storage medium is provided. The non-transitory computer-readable storage medium has stored therein executable instructions that, when loaded and executed by a processor, causes the processor to implement the positioning method as described in the above aspects.

BRIEF DESCRIPTION OF THE DRAWINGS

In order to clearly illustrate the technical solution of the embodiments of the present disclosure, a brief description of drawings used in the embodiments is given below. The drawings in the following descriptions are only part of the embodiments of the present disclosure, and for those skilled in the art, other drawings can be obtained according to these drawings without inventive works.

FIG. 7 is a flowchart of a positioning method according to an embodiment of the present disclosure.

FIG. 8 is a schematic diagram of multi-TRP communication according to an embodiment of the present disclosure.

DETAILED DESCRIPTION

In order to make the purposes, technical solutions and advantages of the present disclosure clear, the following is a further detailed description of the embodiments of the present disclosure in combination with the accompanying drawings.

Firstly, terms involved in the present disclosure are explained below.

Synchronization signal block (SSB) is a signal structure defined in new radio (NR), which includes a primary synchronization signal (PSS), a secondary synchronization signal (SSS) and a physical broadcast channel (PBCH).

Figure 1:
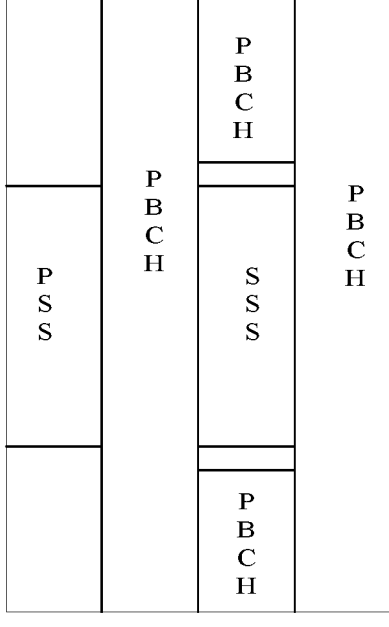
FIG. 1 is a schematic diagram of a time-frequency structure of a synchronization signal block according to an embodiment of the present disclosure.

The SSB is a set of resources (resource units) transmitted on a basic orthogonal frequency division multiplexing (OFDM) grid. In some embodiments, the set of resources includes at least one of a time domain resource, a frequency domain resource, or a code domain resource. FIG. 1 illustrates a time domain structure and a frequency domain structure of an SSB. As shown in FIG. 1, the SSB occupies four continuous OFDM symbols in the time domain.

Subcarrier spacing of the SSB may be 15 KHz, 30 KHz, 120 KHz or 240 KHz. All the SSBs are sent within 5 ms. In order to support beam transmission, each beam needs to send the SSB when the beams exist. The maximum number of SSBs that is sent within 5 ms may be 4 (in a case where a carrier frequency is below 3 GHz), 8 (in a case where the carrier frequency is from 3 GHz to 6 GHz), or 64 (in a case where the carrier frequency is above 6 GHz).

During an initial synchronization between a terminal device and a network device, in response to detecting one of SSBs sent by the network device, the terminal device obtains an SSB index of this SSB and learns a symbol location where this SSB is located, and thus a downlink symbol synchronization between the terminal device and the network device is achieved. In order to achieve uplink synchronization, the terminal device needs to send a random access preamble, and how to select this preamble and how to determine on which random access channel occasion (RO) this preamble is sent are determined according to the SSB received by the terminal device, the SSBs actually sent by the network device and a set of RO locations. A specific process includes the following four operations.

In a first operation, the terminal device detects the SSB index of the received SSB as SSB #1.

In a second operation, the terminal device receives a message of a system information block 1 (SIB1) from the network device, and the message indicates which SSBs are actually sent by the network device.

The network device may use two 8-bit numbers to indicate the SSBs actually sent. Since the maximum SSB transmittable location number is 64, the 64 SSBs are divided into 8 groups, and locations of 8 SSBs within each group are consecutive. That is, SSBs #0 to #7 constitute the first group, SSBs #8 to 15 constitute the second group, and so on, and SSBs #56 to #63 constitute the eighth group. For the two 8-bit numbers, the first 8-bit number indicates a group having the sent SSB(s), for example, the first 8-bit number is 00000001 (in a descending order from left to right), and it means only the first group has the sent SSB(s). The second 8-bit number indicates a location of the sent SSB(s) in the group having the sent SSB(s). For example, the second 8-bit number is 10011011, and it means that in the first group, SSBs #0, #1, #3, #4, and #7 are sent.

In a third operation, according to the executed first and second operations, the terminal device determines that the received SSB #1 is the second SSB of the five SSBs sent by the network device.

In a fourth operation, the terminal device receives the SIB1 from the network device and obtains SSB-perRACH-Occasion information, the information indicates the number of the actually sent SSBs which the preamble within the RO need to be assigned to.

A value of SSB-perRACH-Occasion may be selected from {⅛, ¼, ½, 1, 2, 4, 8, 16}. If the value is ⅛, it means that the SSB occupies 8 consecutive ROs. If the value is 8, it means that the 8 consecutive SSBs that are actually sent share the RO but use different preambles. For example, 64 preambles are divided into 8 consecutive groups, in which each SSB corresponds to one group of the 8 consecutive groups.

Figure 2:
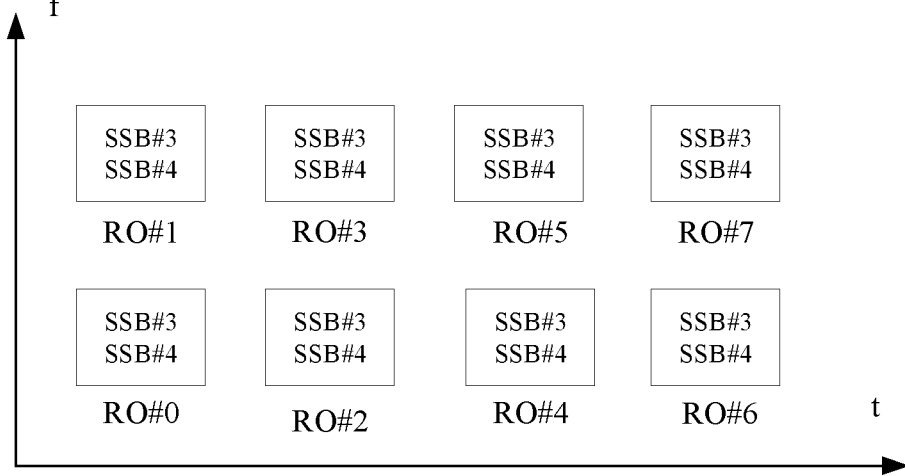
FIG. 2 is a schematic diagram of a random access channel occasion according to an exemplary embodiment of the present disclosure.

Meanwhile, the terminal device receives the SIB1 from the network device and obtains the number of ROs in frequency-division multiplexing (FDM), which may be one of {1, 2, 4, 8}. For example, if the number is 2, it means that there are two ROs in different frequency domains at the same time. The ROs may be numbered in the frequency domain first and then in the time domain. For example, the SSB-perRACH-Occasion value is 2 and the number of the ROs in the FDM is 2, the ROs corresponds to the SSBs are shown in FIG. 2.

Random Access Procedure

The random access procedure is a process from the time the terminal device sends a preamble to the network to attempt to access the network until a basic signaling connection is established with the network. The random access procedure is one of the most basic requirements for any cellular communication system and is used to establish data communication between the terminal device and the network side.

The random access procedure may be performed by a 4-step random access procedure or a 2-step random access procedure.

4-Step Random Access Procedure

Figure 3:
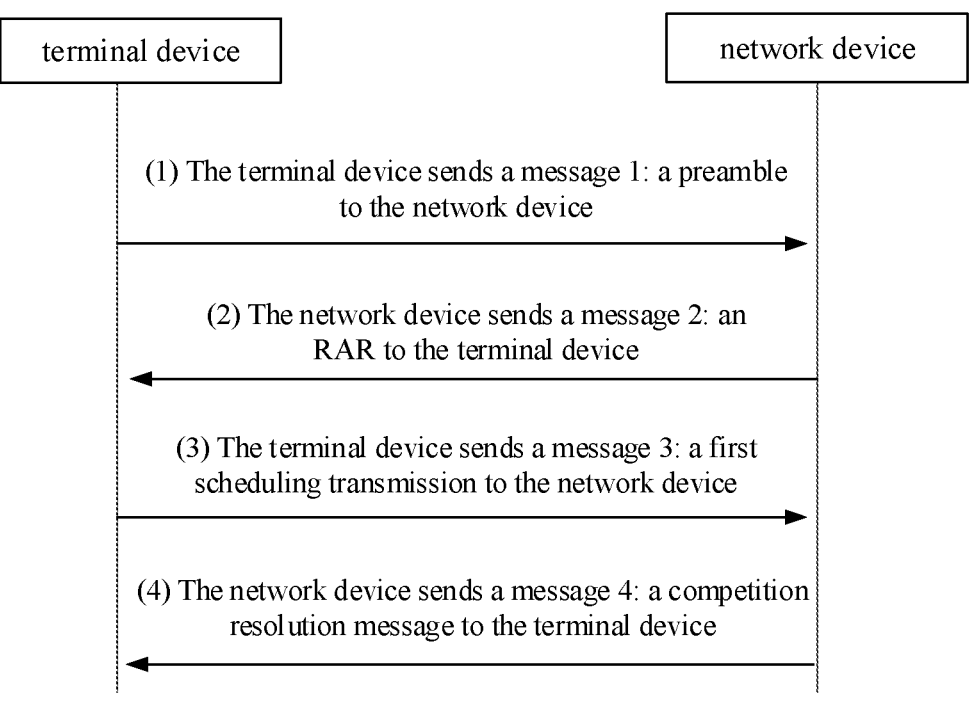
FIG. 3 is a flowchart of a 4-step random access procedure according to an embodiment of the present disclosure.

FIG. 3 illustrates the 4 steps of the random access procedure in a contention-based random access procedure.

(1) The terminal device sends a message 1: a preamble to the network device.

The terminal device sends the preamble to the network device, and the network device estimates a transmission delay of the terminal device based on the preamble to achieve the uplink synchronization.

(2) The network device sends a message 2: a random access response (RAR) to the terminal device.

Based on the transmission delay estimated in block (1) above, the network device sends a timing advance command to adjust a sending time of the terminal device. The message 2 is organized by a media access control (MAC) layer of the network device and is carried by the downlink share channel (DL_SCH).

The network device uses a physical downlink control channel (PDCCH) to schedule the message 2 and addresses (i.e., scrambles) it with a cell radio network temporary identifier (C-RNTI) or a random access radio network temporary identifier (RA-RNTI), and RA-RNTI is determined by a time-frequency resource location of a physical random access channel (PRACH) carrying the message 1. The message 2 includes an uplink transmission timing advance value, which is used to allocate an uplink resource and a temporary C-RNTI for a message 3.

(3) The terminal device sends the message 3: a first scheduling transmission to the network device.

After receiving the message 2, the terminal device transmits the message 3 with the allocated uplink resource and sends a user equipment identifier (UE ID) to the network device via the PUSCH.

(4) The network device sends a message 4: a competition resolution message to the terminal device.

The network device sends the contention resolution message to the terminal device via a physical downlink share channel (PDSCH).

2-Step Random Access Procedure

Figure 4:
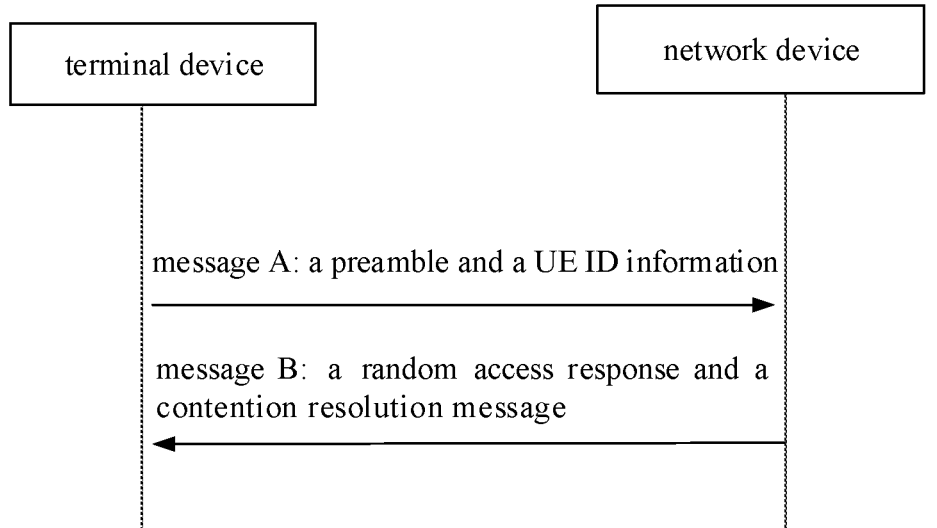
FIG. 4 is a flowchart of a 2-step random access procedure according to an embodiment of the present disclosure.

In the contention-based random access procedure, the 4 steps for the random access procedure can be combined into 2 steps. As shown in FIG. 4, the 2-step random access procedure includes a message A and a message B. The relevant steps are provided as follows.

(1) The terminal device sends the message A to the network device.

(2) The network device receives the message A sent by the terminal device and sends the message B to the terminal device.

Optionally, the message A includes the contents of the message 1 and the message 3. The message A includes: a preamble and a UE ID. The UE ID may be one of a C-RNTI, a temporary C-RNTI, a RA-RNTI, and a non-access stratum (NAS) UE ID.

Optionally, the message B includes the contents of the message 2 and the message 4. The message B includes: a RAR and a contention resolution message.

Figures 5, 6:
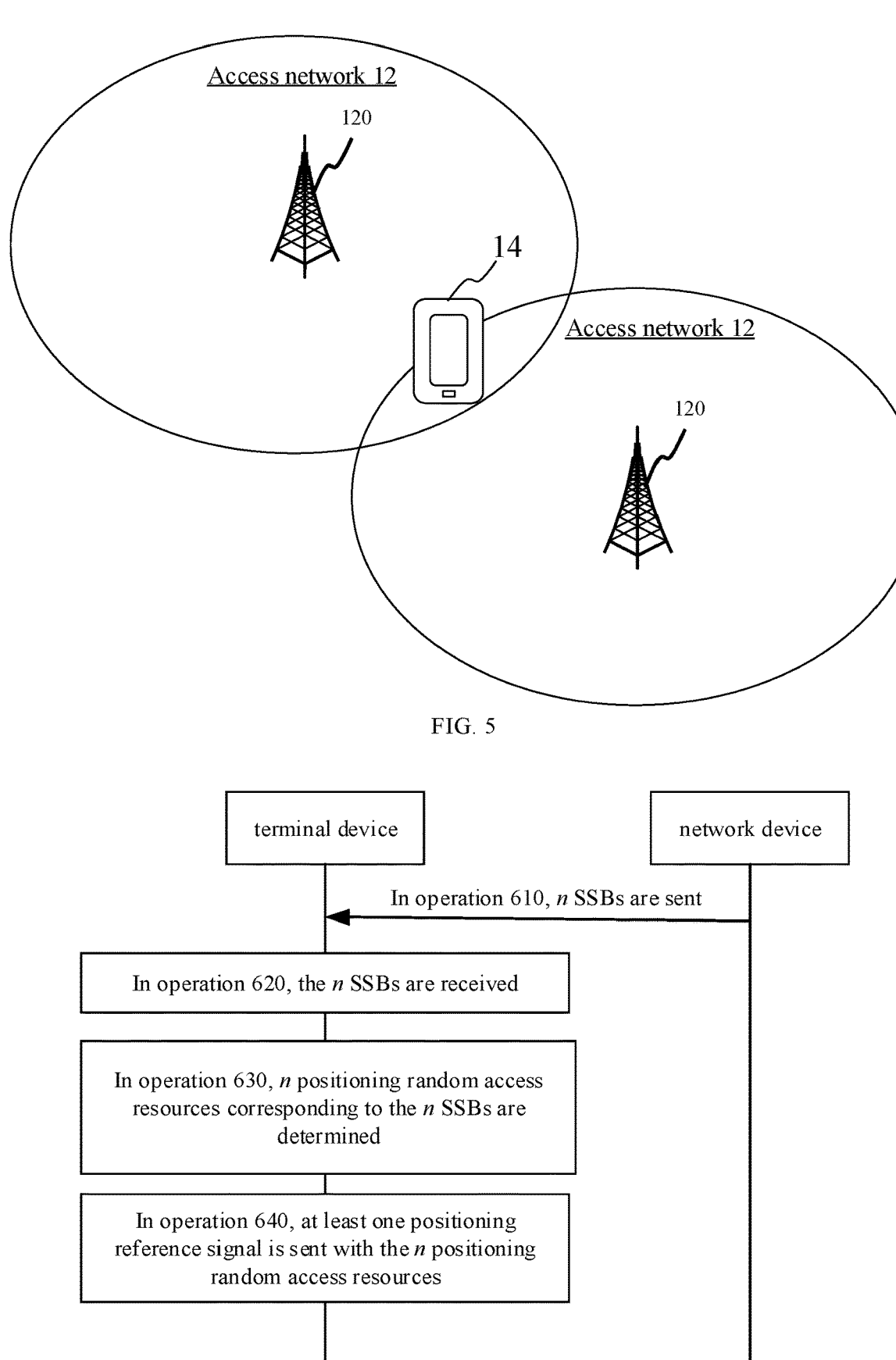
FIG. 5 is a schematic diagram of a communication system according to an embodiment of the present disclosure.
FIG. 6 is a flowchart of a positioning method according to an embodiment of the present disclosure.

FIG. 5 is a block diagram of a communication system according to an embodiment of the present disclosure. The communication system may include: an access network 12 and a terminal device 14.

The access network 12 includes a plurality of network devices 120. The network device may be a base station. The base station is a device deployed in the access network to provide a wireless communication function for the terminal device. The base station may include various forms of macro base stations, micro base stations, relay stations, and access points. In a system using different radio access technologies, the name of the device having the functions of the base station may be different, for example, it can be called eNodeB or eNB in a long term evolution (LTE) system, or gNodeB or gNB in a 5G NR system. The description of "base station" may change as the communication technology evolves. For ease of description in this disclosure, the devices described above that provide wireless communication capabilities for the terminal device 14 are collectively referred to as the network device.

The terminal device 14 may include a variety of handheld devices with wireless communication capabilities, in-vehicle devices, wearable devices, computing devices or internet of things (IoT) devices or industrial internet of things (IIoT) devices or other processing devices connected to a wireless modem, and various forms of user devices, such as mobile stations (MSs) and terminal devices. For ease of description, the devices mentioned above are collectively referred to as the terminal device. The network device 120 and the terminal device 14 communicate with each other via a certain radio interface technology, such as a Uu interface.

The technical solution of the embodiments of the present disclosure can be applied to various communication systems, for example, a global system of mobile communication (GSM) system, a code division multiple access (CDMA) system, a wideband code division multiple access (WCDMA) system, a general packet radio service (GPRS), a LTE system, a LTE frequency division duplex (FDD) system, a LTE time division duplex (FDD) system, an advanced long term evolution (LTE-A) system, a NR system, an evolved system of the NR system, a LTE-based access to unlicensed spectrum (LTE-U) system, a NR-U system, a universal mobile telecommunication system (UMTS), a worldwide interoperability for microwave access (WiMAX) communication system, wireless local area networks (WLAN), wireless fidelity (Wi-Fi), next-generation communication systems or other communication systems.

Generally, traditional communication systems support a limited number of connections and are easy to implement. However, with the development of the communication technologies, the mobile communication system supports not only the traditional communication, but also, for example, a device to device (D2D) communication, a machine to machine (M2M) communication, a machine type communication (MTC), a vehicle to vehicle (V2V) communication, and a vehicle to everything (V2X) system. The embodiments of the present disclosure can also be applied to these communication systems.

FIG. 6 is a flowchart of a positioning method according to an embodiment of the present disclosure. This method can be applied to the terminal device and the network device as shown in FIG. 5. The method includes the following operations.

In block 610, one or more network devices send n SSBs to a terminal device.

In the above operation, n is an integer greater than or equal to 2.

For example, the one or more network devices are in one or more cells. The one or more cells may include a serving cell where the terminal device is located and one or more neighboring cell adjacent to the serving cell. For example, one or more TRPs are located in the one or more network devices, and the multiple TRPs may belong to the serving cell where the terminal device is located or to the neighboring cell(s). Each of the one or more network devices sends the SSBs in a beam scanning manner, i.e., it sends different SSBs on different beams in the form of TDM. The network device(s) can send the SSBs periodically, and a period may be 5 ms, 10 ms, or 20 ms. Different network devices can send the same SSB(s) or different SSBs on different beams simultaneously.

Optionally, the value of n is determined by the network device(s), the LMF or an Access and Mobility Management Function (AMF), or is pre-configured in a protocol and stored in a terminal chip. Optionally, to achieve high-precision positioning, n is an integer greater than or equal to 3. For example, the one or more network devices send 3 or more SSBs to the terminal device.

In block 620, the terminal device receives the n SSBs.

The terminal device receives the n SSBs sent by the network device(s).

In the Fifth Generation (5G) mobile communication system, the 5G radio resource control (RRC) supports three states, namely RRC_IDLE state (i.e., an idle state), RRC_INACTIVE state (i.e., an inactive state) and RRC_CONNECTED state (i.e., a connected state). With the development of the technologies, other states may be added, and the names of these aforementioned states may be changed. However, these changes do not affect the implementability and completeness of the technical solution of the present disclosure, and these changed names shall also be considered to be within the scope of protection of the present disclosure.

Optionally, the terminal device receives the SSB(s) while it is in the idle state. When the terminal device is in the idle state, paging for the terminal device is initiated by a core network (CN), and a paging area is configured by the CN. No UE access stratum (AS) context of the terminal device exists in the network device and there is no RRC connection between the terminal device and the CN.

Optionally, the terminal device is in the inactive state when it receives the SSB(s). Alternatively, the terminal device is in the connected state but a beam failure or a radio link failure (RLF) happens.

In block 630, the terminal device determines n positioning random access resources corresponding to the n SSBs.

In the embodiments of the present disclosure, one of the n SSBs may correspond to one of the n positioning random access resources, respectively, or one of the n SSBs may correspond to two or more positioning random access resources, or two or more SSBs may correspond to one positioning random access resource.

The terminal device may determine m positioning random access resources corresponding to the n SSBs in block 630, in which, n=m, or n≠m.

The positioning random access resources are random access resources for positioning. Optionally, one of the positioning random access resources includes, but is not limited to, at least one of a random access time domain resource, a random access frequency domain resource or a preamble.

Each SSB corresponds to one or more positioning random access resources. After receiving one SSB, the terminal device can determine the one or more positioning random access resource corresponding to the SSB.

In block 640, the terminal device sends at least one positioning reference signal according to the n positioning random access resources.

In some embodiments, the terminal device determines the positioning reference signal(s) corresponding to the n positioning random access resources in block 640.

One positioning reference signal is a reference signal used for the network device(s) to perform a positioning measurement for the terminal device and determine a geographical location of the terminal device(s). In this case, one positioning reference signal is an uplink reference signal. Optionally, one positioning reference signal includes: a random access preamble.

After the n positioning random access resources corresponding to the n SSBs are determined, the terminal device may send n positioning reference signals on the n random access resources, respectively, and the network device(s) perform the positioning measurement based on the positioning reference signal(s).

In some embodiments, one positioning random access resource may be at least one of a time domain resource, a frequency domain resource, or a code domain resource.

Optionally, the terminal device sends the n positioning reference signals to a same cell or to different cells. The terminal device sends the n positioning reference signals to one or more TRPs of the same cell or to one or more TRPs of different cells.

According to the method of the embodiments of the present disclosure, the one or more network devices send the n SSBs to the terminal device, for the terminal device using the n positioning random access resources corresponding to the n SSBs, and the terminal device sends the positioning reference signals according to the n SSBs separately. By using the random access resources, the positioning method for the terminal device is provided, even during the random access procedure of the terminal device.

Further, compared to the positioning method in which the terminal device sends the positioning reference signal according to only one SSB, the method of the embodiments improves the positioning accuracy by increasing the number of positioning reference signals to cause the network devices to perform the positioning measurement for the terminal device.

Based on an optional embodiment of FIG. 6, FIG. 7 illustrates a flowchart of a positioning method according to an embodiment of the present disclosure, and the method can be applied to the terminal device and the network device shown in FIG. 5. In this embodiment, operation in block 640 can be replaced by operation in block 641, and the method further includes an operation in block 650.

In block 610, the one or more network devices send n SSBs to the terminal device. In this operation, n is an integer greater than or equal to 2.

The terminal device and the network device(s) can communicate with each other based on multiple TRPs. In an implementation, the n SSBs are from different TRPs of different cells. In another implementation, then SSBs are from different TRPs of a same cell. In yet another implementation, the n SSBs are from a same TRP of a same cell.

That is, the network device(s) can send the n SSBs by different TRPs of different cells, by different TRPs of a same cell, or by a same TRP of a same cell.

For example, with reference to FIG. 8, the terminal device 810 is located in the coverage of the serving cell and also in the coverage of the neighboring cell(s). Each cell may be covered by one or more TRPs. As shown in FIG. 2, a serving cell is jointly covered by TRP 1 and TRP 2, thereby increasing a coverage radius of the serving cell. A neighboring cell is covered by TRP 3.

In a case where n is 3, the one or more network devices send 3 SSBs to a terminal device. These 3 SSBs may be from TRP 1 of the serving cell (i.e., the same TRP of the same cell), or may be from TRP 1 and TRP 2 of the serving cell (i.e., different TRPs of the same cell), or may be from TRP 1 and TRP 2 of the serving cell and TRP 3 of the neighboring cell (i.e., different TRPs of different cells).

In block 620, the terminal device receives the n SSBs.

In an implementation, the n SSBs are from different TRPs of different cells. In another implementation, the n SSBs are from different TRPs of a same cell. In yet another implementation, the n SSBs are from a same TRP of a same cell.

Optionally, the terminal device measures an RSRP of the SSBs. The RSRP is an average value of powers of the signals received on all resource elements (RE) carrying the reference signal within a given symbol. For each SSB of the n SSBs, the RSRP of the SSB measured by the terminal device is greater than a threshold value of an RSRP.

The threshold value of the RSRP is a threshold value for positioning. The threshold value of the RSRP is independent of a threshold value determined for a random access or a candidate beam, that is, the above threshold value of the RSRP may or may not be the same value as one of the other two threshold values.

Optionally, the terminal device sends the preambles corresponding to the n positioning random access resources using different sending beams via the plurality of random access channels corresponding to the n positioning random access resources.

For example, the terminal device may include a plurality of antenna panels. The terminal device uses different antenna panels (which correspond to different sending beams) or different sending beams of the same antenna panel to send the preamble(s) corresponding to the n positioning random access resources to different TRPs of different cells, to different TRPs of the same cell, or to the same TRP.

Optionally, the terminal device sends the preamble(s) corresponding to the n positioning random access resources using identical or different transmission powers via the random access channels corresponding to the n positioning random access resources. That is, the transmission powers of the preambles corresponding to the n SSBs may be identical or different.

In block 630, the terminal device determines the n positioning random access resources corresponding to the n SSBs.

The positioning random access resources are random access resources for positioning.

Optionally, one positioning random access resource includes at least one of a random access time domain resource, a random access frequency domain resource or a preamble. At least one of the random access time domain resource, the random access frequency domain resource or the preamble, corresponding to n SSBs, is different.

In block 641, the terminal device sends the at least one preamble corresponding to the n positioning random access resources with the at least one random access channel resource corresponding to the n positioning random access resources.

One positioning reference signal includes at least one preamble.

In the embodiments of the present disclosure, one of the n SSBs may correspond to one of then preambles, respectively. Alternatively, one of the SSBs may correspond to two or more preambles. Alternatively, two or more of the SSBs may correspond to one preamble.

The terminal device determines L preambles corresponding to the n SSBs in block 641, in which n=L, or n≠L.

Optionally, when the terminal device needs to send a preamble corresponding to a random access resource, how to select this preamble and how to determine a random access time domain resource and a random access frequency domain resource (i.e., RO) with which this preamble is sent are determined based on this SSB received by the terminal device and the SSBs actually sent by the network device(s) and a set of RO locations, which can refer to the process described above.

In an implementation, n preambles are sent to different TRPs of different cells. In another implementation, n preambles are sent to different TRPs of a same cell. In yet another implementation, n preambles are sent to a same TRP of a same cell.

For example, with reference to FIG. 8, in a case where n is 3, the terminal device sends 3 preambles to the network device(s). These 3 preambles may be sent to TRP 3 of the neighboring cell (i.e., the same TRP of the same cell). These 3 preambles may be sent to TRP 1 and TRP 2 of the serving cell (i.e., different TRPs of the same cell). These 3 preambles may be sent to TRP 1 and TRP 2 of the serving cell and TRP 3 of the neighboring cell (i.e., different TRPs of different cells).

In block 650, the one or more network devices receive the at least one preamble corresponding to the n positioning random access resources with the at least one random access channel resource corresponding to the n positioning random access resources.

In the embodiments of the present disclosure, one of the n SSBs may correspond to one of then preambles, respectively. Alternatively, one of the SSBs may correspond to two or more preambles. Alternatively, two or more of the SSBs may correspond to one preamble.

Further, in block 650, the one or more network devices may receive the at least one preamble corresponding to L positioning random access resources with the at least one random access channel resource corresponding to the n positioning random access resources, in which n=L, or n≠L.

Since the terminal device sends the preamble(s) corresponding to the n positioning random access resources with the at least one random access channel resource corresponding to the n positioning random access resources, the one or more network devices receive the at least one preamble corresponding to the n positioning random access resources with the at least one random access channel resource corresponding to the n positioning random access resources accordingly.

In an implementation, the one or more network devices receive, via different TRPs of different cells, the at least one preamble corresponding to the n positioning random access resources with the at least one random access channel resource corresponding to the n positioning random access resources. In another implementation, the one or more network devices receive, via different TRPs of a same cell, the at least one preamble corresponding to the n positioning random access resources with the at least one random access channel resource corresponding to the n positioning random access resources. In yet another implementation, the one or more network devices receive, via a same TRP of a same cell, the at least one preamble corresponding to the n positioning random access resources with the at least one random access channel resource corresponding to the n positioning random access resources.

Optionally, after the one or more network devices receive the preamble(s) corresponding to the n positioning random access resources, the one or more network devices obtain measurement value(s) by measuring the preamble(s) corresponding to the n positioning random access resources. The measurement value includes at least one of a time measurement value, a signal strength measurement value or an angle measurement value of the preamble corresponding to the positioning random access resource.

The time measurement value includes, but is not limited to, at least one of a reference signal time difference (RSTD) or an Rx-Tx time difference. The signal strength measurement value includes, but is not limited to, at least one of an RSRP, a reference signal received quality (RSRQ), or a received signal strength indicator (RSSI). The angle measurement value includes, but is not limited to, at least one of an angle of departure (AoD) or an angle of arrival (AoA). The network device can use the above measurement values for positioning calculation, or report the above measurement values to the LMF for positioning calculation.

Optionally, after the terminal device sends the preamble(s) corresponding to the n positioning random access resources, the terminal device performs the following operations.

(I) The terminal device determines n random access feedback window durations corresponding to the n positioning random access resources.

The positioning random access resources correspond to the random access feedback window durations. Optionally, the random access feedback window durations are configured by a high-level parameter.

In the embodiments of the present disclosure, one of the n SSBs may correspond to one of the n random access feedback window durations, respectively. Alternatively, one of the SSBs may correspond to two or more random access feedback window durations. Alternatively, two or more of the SSBs may correspond to one random access feedback window duration.

Therefore, the above operation may also be: determining p random access feedback window durations corresponding to the n positioning random access resources, where n=p, or n≠p.

(II) The terminal device detects at least one random access feedback within the n random access feedback window durations and determines at least one feedback timing.

The at least one random access feedback is the feedback(s) for the at least one preamble, and the at least one feedback timing is the time at which the random access feedback is detected.

Optionally, after the at least one preamble is received successfully, the one or more network devices send the at least one random access feedback corresponding to the at least one preamble to the terminal device. The terminal device detects the at least one random access feedback during the n random access feedback window durations, and in response to detecting the at least one random access feedback, the time at which the random access feedback is detected is determined as the feedback timing.

Similar to the aforementioned operation 1, this operation may also be: detecting the at least one random access feedback within the p random access feedback window durations and determining the at least one feedback timing.

(III) The terminal device determines at least one time difference.

The at least one time difference is the difference(s) between the feedback timing and a sending time of the preamble corresponding to the random access feedback, and the time difference is used for positioning calculation.

In an implementation, the terminal device sends the at least one time difference to one or more network devices. In another implementation, the terminal device sends the at least one time difference to the LMF network element.

For example, the one or more network devices receive the at least one time difference determined by the terminal device and determine distance(s) between the one or more network devices and the terminal device.

According to the method provided in the embodiments of the present disclosure, the terminal device sends the preambles to TRPs or network devices of cells according to the n SSBs, respectively, to facilitate the participation of the multiple TRPs or the multiple network devices of the cells in the positioning and measurement, which can improve the accuracy of positioning and reduce the positioning delay.

According to the method provided in the embodiments, the terminal device further receives the at least one random access feedback from the TRPs or the cells within a plurality of random access feedback windows, and the time differences of the different TRPs or the different cells are obtained to perform the positioning calculation.

In an optional embodiment for FIG. 6, the random access procedure of the SSB includes either a 2-step random access procedure or a 4-step random access procedure.

Case 1: 2-Step Random Access Procedure

If the random access procedure of the SSB includes the 2-step random access procedure, the terminal device sends the at least one preamble while sending a notification message via an MsgA (i.e., message A) transmitted by the PUSCH. The MsgA may be transmitted by PRACH or PUSCH.

Accordingly, the one or more network devices receive the notification message via the MsgA transmitted by the PUSCH. The notification message includes at least one of a transmission power value for the preamble, a result value of positioning reference signal measurement or an identification information of the terminal device.

The result value of the positioning reference signal measurement is a result value obtained by measuring the positioning reference signal (PRS) after the terminal device receives the downlink PRS. The PRS measurement result value includes, but is not limited to, at least one of a signal strength measurement value, a time measurement value or an angle measurement value. The time measurement value includes, but is not limited to, at least one of a RSTD or an Rx-Tx time difference. The signal strength measurement value includes, but is not limited to, at least one of an RSRP, an RSRQ or an RSSI. The angle measurement value includes, but is not limited to, at least one of an AoD or an AoA.

The identification information of the terminal device is configured to inform the one or more network devices which terminal device sends the PRS. The identification information of the terminal device can be recorded as a UE ID, which can be one of a C-RNTI, a temporary C-RNTI, a RA-RNTI or a NAS UE ID.

Case 2: 4-Step Random Access Procedure

The random access procedure of the SSB includes the 4-step random access procedure, and in this case the terminal device sends the notification message via the Msg3 transmitted by the PUSCH.

Accordingly, the one or more network devices receive the notification message via the Msg3 (i.e., message 3) transmitted by the PUSCH. The notification message includes at least one of a transmission power value for the preamble, a PRS measurement result value or an identification information of the terminal device.

The PRS measurement result value is a result value obtained by measuring the PRS after the terminal device receives the downlink PRS. The PRS measurement result value includes, but is not limited to, at least one of a signal strength measurement value, a time measurement value, or an angle measurement value. The time measurement value includes, but is not limited to, at least one of a RSTD or an Rx-Tx time difference. The signal strength measurement value includes, but is not limited to, at least one of an RSRP, an RSRQ or an RSSI. The angle measurement value includes, but is not limited to, at least one of an AoD or an AoA.

The identification information of the terminal device is configured to inform the one or more network devices which terminal device sends the PRS. The identification information of the terminal device can be recorded as a UE ID, which can be one of a C-RNTI, a temporary C-RNTI, a RA-RNTI or a NAS UE ID.

According to the method provided in the embodiments, the terminal device sends the notification message via the PUSCH by either the 2-step random access procedure or the 4-step random access procedure, and the notification message can further notify the one or more network devices of positioning-related information, thereby improving the positioning accuracy.

In an optional embodiment for FIG. 6, the state of the terminal device after the transmission of the PRS according to then positioning random access resources is any one of the following states.

In a first case, after the random access procedure is completed, the terminal device switches back to an idle state.

In a second case, after the random access procedure is completed, the terminal device switches to a connected state to report the notification message, and then switches back to the idle state.

The notification message includes at least one of a transmission power value for the preamble, a PRS measurement result value or an identification information of the terminal device.

The PRS measurement result value is a result value obtained by measuring the downlink PRS after the terminal device receives the downlink PRS. The PRS measurement result value includes, but is not limited to, at least one of a signal strength measurement value, a time measurement value, or an angle measurement value. The time measurement value includes, but is not limited to, at least one of a RSTD or an Rx-Tx time difference. The signal strength measurement value includes, but is not limited to, at least one of an RSRP, an RSRQ or an RSSI. The angle measurement value includes, but is not limited to, at least one of an AoD or an AoA.

The identification information of the terminal device is configured to inform the one or more network devices which terminal device sends the PRS. The identification information of the terminal device can be recorded as a UE ID, which can be one of a C-RNTI, a temporary C-RNTI, a RA-RNTI, or a NAS UE ID.

In a third case, after the random access procedure is completed, the terminal device switches to the connected state for service transmission.

Optionally, the terminal device switches to the connected state and uses the PRS measurement result value for the service transmission.

According to the method provided in the embodiments, after the transmission of the PRS is completed, the terminal device may switches to the connected state, or may not switch to the connected state, or may switch to the connected state and then switch back to the idle state, which is convenient for the terminal device to adjust its state according to the needs of different scenarios.

It should be noted that the above method embodiments can be implemented separately or in combination, which is not limited in the present disclosure.

In the above embodiments, the steps/operations performed by the terminal device can be implemented separately as the positioning method performed at the terminal device side, and the steps/operations performed by the network device can be implemented separately as the positioning method performed at the network device side.

Figure 9:
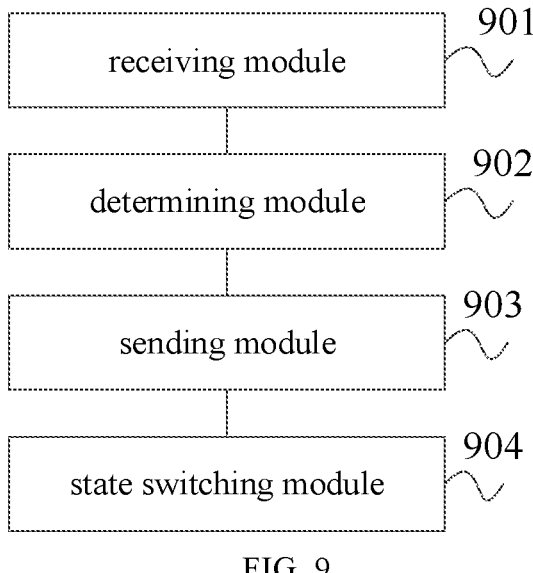
FIG. 9 is a block diagram of a positioning apparatus according to an embodiment of the present disclosure.

FIG. 9 is a block diagram of a positioning apparatus according to an embodiment of the present disclosure. The apparatus may be implemented as a terminal device or a portion of a terminal device. The apparatus includes: a receiving module 901, a determining module 902 and a sending module 903.

The receiving module 901 is configured to receive n synchronization signal blocks, n being an integer greater than or equal to 2. The determining module 902 is configured to determine n positioning random access resources corresponding to the n synchronization signal blocks. The positioning random access resources are random access resources for positioning. The sending module 903 is configured to send at least one positioning reference signal according to the n positioning random access resources.

In an optional embodiment, the sending module 903 is configured to send, with at least one random access channel resource corresponding to the n positioning random access resources, at least one preamble corresponding to the n positioning random access resources.

In an optional embodiment, n preambles are sent to different transmission reception points (TRPs) of different cells; or n preambles are sent to different TRPs of a same cell; or n preambles are sent to a same TRP of a same cell.

In an optional embodiment, the sending module 903 is configured to send, with the at least one random access channel resource corresponding to the n positioning random access resources, the at least one preamble corresponding to the n positioning random access resources by using different sending beams.

In an optional embodiment, the sending module 903 is configured to send, with the at least one random access channel recourse corresponding to the n positioning random access resources, the at least one preamble corresponding to the n positioning random access resources with identical or different transmission powers.

In an optional embodiment, the determining module 902 is configure to determine n random access feedback window durations corresponding to the n positioning random access resources; detect a random access feedback within the n random access feedback window durations, and determine at least one feedback timing, in which the at least one random access feedback is the feedback(s) for the at least one preamble, and the at least one feedback timing is the time at which the random access feedback is detected; and determine at least one time difference, in which the at least one time difference is the difference(s) between the feedback timing and a sending time of the preamble corresponding to the random access feedback, and the time difference is used for positioning calculation.

In an optional embodiment, the sending module 903 is configure to send the at least one time difference to one or more network devices; or send the at least one time difference to a location management function (LMF) network element.

In an optional embodiment, reference signal receiving powers (RSRPs) of the n synchronization signal blocks are greater than a threshold value of an RSRP.

In an optional embodiment, the n synchronization signal blocks are from different TRPs of different cells; or the n synchronization signal blocks are from different TRPs of a same cell; or the n synchronization signal blocks are from a same TRP of a same cell.

In an optional embodiment, the positioning random access resource includes: a random access time domain resource, a random access frequency domain resource, and a preamble. At least one of the random access time domain resource, the random access frequency domain resource or the preamble, corresponding to the n synchronization signal blocks, is different.

In an optional embodiment, a random access procedure of the synchronization signal block includes a 2-step random access procedure or a 4-step random access procedure.

In an optional embodiment, the random access procedure of the synchronization signal block includes the 2-step random access procedure, and the sending module 903 is further configured to send a notification message via an MsgA transmitted by a physical uplink shared channel (PUSCH).

In an optional embodiment, the random access procedure of the synchronization signal block includes the 4-step random access procedure, and the sending module 903 is further configured to send a notification message via an Msg3 transmitted by a PUSCH.

In an optional embodiment, the apparatus further includes a state switching module 904, configured to switch the terminal device back to an idle state after a random access procedure; or configured to switch the terminal device to a connected state to report a notification message after the random access procedure is completed and to switch the terminal device back to the idle state after the reporting; or configured to switch the terminal device to the connected state for service transmission after the random access procedure is completed.

In an optional embodiment, the notification message includes at least one of a transmission power value for the preamble, a result value of positioning reference signal measurement, or an identification information of the terminal device.

In an optional embodiment, the result value of the positioning reference signal measurement includes at least one of a signal strength measurement value, a time measurement value or an angle measurement value acquired by measuring the positioning reference signal received by the terminal device.

Figure 10:
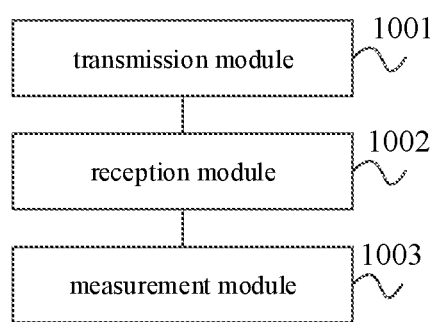
FIG. 10 is a block diagram of a positioning apparatus according to an embodiment of the present disclosure.

FIG. 10 is a block diagram of a positioning apparatus according to an embodiment of the present disclosure. The apparatus may be implemented as a network device or a portion of a network device. The apparatus includes: a transmission module 1001, configured to send n synchronization signal blocks to a terminal device, n being an integer greater than or equal to 2. The n synchronization signal blocks are provided for the terminal device to determine n positioning random access resources, and the positioning random access resources are random access resources for positioning.

In an optional embodiment, the apparatus further includes a reception module 1002 configured to receive, with at least one random access channel resource corresponding to the n positioning random access resources, at least one preamble corresponding to the n positioning random access resources.

In an optional embodiment, the reception module 1002 is configured to receive, with the at least one random access channel resource corresponding to the n positioning random access resources, the at least one preamble corresponding to the n positioning random access resources via different TRPs of different cells; or receive, with the at least one random access channel resource corresponding to the n positioning random access resources, the at least one preamble corresponding to the n positioning random access resources via different TRPs of a same cell; or receive, with the at least one random access channel resource corresponding to the n positioning random access resources, the at least one preamble corresponding to the n positioning random access resources via a same TRP of a same cell.

In an optional embodiment, the apparatus further includes: a measurement module 1003 configured to obtain a measurement value by measuring the at least one preamble corresponding to the n positioning random access resources. The measurement value includes at least one of a time measurement value, a signal strength measurement value or an angle measurement value of the preamble corresponding to the positioning random access resource.

In an optional embodiment, a random access procedure of the synchronization signal block includes a 2-step random access procedure, and the apparatus further includes a reception module 1002 configured to receive a notification message via an MsgA transmitted by a PUSCH.

In an optional embodiment, a random access procedure of the synchronization signal block includes: a 4-step random access procedure, and the apparatus further includes a reception module 1002 configured to receive a notification message via an Msg3 transmitted by a PUSCH.

In an optional embodiment, the notification message includes at least one of a transmission power value for the preamble, a result value of positioning reference signal measurement or an identification information of the terminal device.

In an optional embodiment, the result value of the positioning reference signal measurement includes at least one of a signal strength measurement value, a time measurement value or an angle measurement value acquired by measuring the positioning reference signal received by the terminal device.

Figure 11:
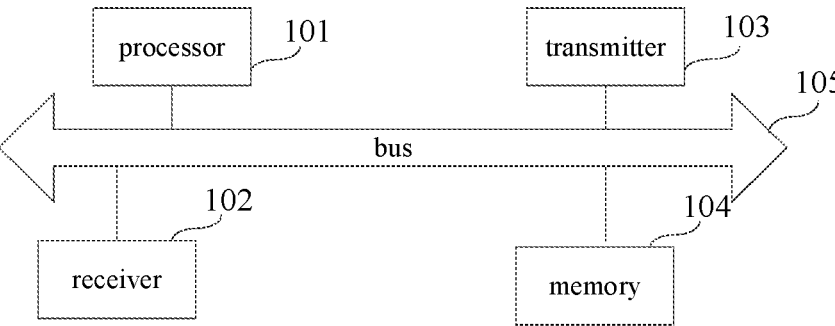
FIG. 11 is a block diagram of a communication device according to an embodiment of the present disclosure.

FIG. 11 is a block diagram of a communication device (a terminal device or a network device) according to an embodiment of the present disclosure. The communication device includes: a processor 101, a receiver 102, a transmitter 103, a memory 104, and a bus 105. The processor 101 includes one or more processing cores. The processor 101 performs various functional applications and processes information by running software programs and modules. The receiver 102 and the transmitter 103 may be implemented as a communication component, which may be a communication chip. The memory 104 is connected to the processor 101 via the bus 105. The memory 104 is configured to store at least one instruction. The processor 101 is configured to execute the at least one instruction to implement the operations in the method embodiments described above.

In addition, the memory 104 may be implemented by any type of volatile or non-volatile storage device or a combination thereof. The volatile or non-volatile storage device includes, but is not limited to: a disk or an optical disk, an electrically erasable programmable read only memory (EE-PROM), an erasable programmable read only memory (EPROM), a static random access memory (SRAM), a read-only memory (ROM), a magnetic memory, a flash memory, and a programmable read-only memory (PROM).

In an embodiment, a non-transitory computer readable storage medium is provided. The non-transitory computer readable storage medium stores at least one instruction, at least one program, a code set or an instruction set. The at least one instruction, the at least one program, the code set or the instruction set are loaded and executed by the processor to allow the communication device to implement the positioning method as provided in each embodiment of the above method embodiments.

In an embodiment, a computer program product or a computer program is provided. The computer program product or the computer program includes computer instructions, and the computer instructions are stored in the computer readable storage medium. The processor of the computer device reads the computer instructions from the computer readable storage medium, and the processor executes the computer instructions such that the computer device can perform the positioning method provided in the above aspects of the present disclosure.

Those skilled in the art can understand that all or part of the operations in the above embodiments can be executed by hardware, or the relevant hardware can be instructed to execute the above embodiments by a program. The program may be stored in a computer readable storage medium, which may be a ROM, a disk or a CD-ROM.

The foregoing are only optional embodiments of the present disclosure and are not intended to limit the present disclosure. Any modifications, equivalent substitutions, improvements made within the spirit and principles of the present disclosure shall be included within the scope of protection of the present disclosure.

What is claimed is:

1. A positioning method, applied in a terminal device, comprising:

receiving a plurality of synchronization signal blocks from a network device;

determining a plurality of positioning random access resources corresponding to the plurality of synchronization signal blocks, wherein the positioning random access resources are random access resources for positioning; and sending at least one positioning reference signal according to the plurality of positioning random access resources;

wherein sending the at least one positioning reference signal according to the plurality of positioning random access resources comprises:

sending, with n random access channel resources corresponding to n positioning random access resources, n preambles corresponding to the n positioning random access resources, wherein n is an integer greater than or equal to 2;

wherein the synchronization signal blocks are from different transmission reception points (TRPs) of different cells, and the n preambles are sent to different TRPs of different cells; or the synchronization signal blocks are from different TRPs of a same cell, and the n preambles are sent to different TRPs of the same cell.

2. The method of claim 1, wherein sending, with the at least one random access channel resource corresponding to the plurality of positioning random access resources, the at least one preamble corresponding to the plurality of positioning random access resources, comprises at least one of:

sending, with the at least one random access channel resource corresponding to the plurality of positioning random access resources, the at least one preamble corresponding to the plurality of positioning random access resources by using different sending beams, or sending, with the random access channel recourse corresponding to the plurality of positioning random access resources, the preamble corresponding to the plurality of positioning random access resources with different or identical transmission powers.

3. The method of claim 1, further comprising:

determining a plurality of random access feedback window durations corresponding to the plurality of positioning random access resources;

detecting at least one random access feedback within the plurality of random access feedback window durations, and determining at least one feedback timing, wherein the at least one random access feedback is the feedback for the at least one preamble, and the at least one feedback timing is the time at which the random access feedback is detected; and determining at least one time difference, wherein the at least one time difference is the difference between the feedback timing and a sending time of the preamble corresponding to the random access feedback, and the time difference is used for positioning calculation.

4. The method of claim 3, further comprising:

sending the at least one time difference to one or more network devices;

or sending the at least one time difference to a location management function (LMF) network element.

5. The method of claim 1, wherein the plurality of synchronization signal blocks are from different TRPs of different cells;

or the plurality of synchronization signal blocks are from different TRPs of a same cell;

or the plurality of synchronization signal blocks are from a same TRP of a same cell.

6. The method of claim 1, wherein the positioning random access resource comprises: a random access time domain resource, a random access frequency domain resource, and a preamble;

at least one of the random access time domain resource, the random access frequency domain resource or the preamble, corresponding to the plurality of synchronization signal blocks, is different; and reference signal receiving powers (RSRPs) of the plurality of synchronization signal blocks are greater than a threshold value of an RSRP.

7. The method of claim 1, wherein a random access procedure of the synchronization signal block comprises a 2-step random access procedure or a 4-step random access procedure, wherein the random access procedure of the synchronization signal block comprises the 2-step random access procedure, and further comprises:

sending a notification message via an MsgA transmitted by a physical uplink shared channel (PUSCH), and wherein the random access procedure of the synchronization signal block comprises the 4-step random access procedure, and further comprises:

sending a notification message via an Msg3 transmitted by a PUSCH.

8. The method of claim 7, wherein the notification message comprises at least one of:

a transmission power value for the preamble, a result value of positioning reference signal measurement, or an identification information of the terminal device, wherein the result value of the positioning reference signal measurement comprises at least one of:

a signal strength measurement value, a time measurement value or an angle measurement value acquired by measuring the positioning reference signal received by the terminal device.

9. The method of claim 1, further comprising:

after a random access procedure is completed, switching back to an idle state;

or after the random access procedure is completed, switching to a connected state to report a notification message and switching back to the idle state after the reporting;

or after the random access procedure is completed, switching to the connected state for service transmission.

10. A non-transitory computer-readable storage medium having stored therein executable instructions that, when loaded and executed by at least one processor, causes the at least one processor to implement the positioning method of claim 1.

11. A positioning method, comprising:

sending a plurality of synchronization signal blocks to a terminal device;

wherein the plurality of synchronization signal blocks are provided for the terminal device to determine a plurality of positioning random access resources, and the positioning random access resources are random access resources for positioning;

wherein the method further comprises: receiving, with at least one random access channel resource corresponding to the plurality of positioning random access resources, at least one preamble corresponding to the plurality of positioning random access resources;

wherein n synchronization signal blocks are provided for the terminal device to determine n positioning random access resources, wherein n is an integer greater than or equal to 2, and receiving, with the at least one random access channel resource corresponding to the plurality of positioning random access resources, the at least one preamble corresponding to the plurality of positioning random access resources, comprises:

when the n synchronization signal blocks are from different TRPs of different cells, receiving, with n random access channel resources corresponding to the n positioning random access resources, n preambles corresponding to the n positioning random access resources via different TRPs of different cells; or when the n synchronization signal blocks are from different TRPs of a same cell, receiving, with n random access channel resources corresponding to the n positioning random access resources, n preambles corresponding to the n positioning random access resources via different TRPs of the same cell.

12. The method of claim 11, further comprising:

obtaining a measurement value by measuring the at least one preamble corresponding to the plurality of positioning random access resources;

wherein the measurement value comprises at least one of:

a time measurement value, a signal strength measurement value or an angle measurement value of the preamble corresponding to the positioning random access resource.

13. The method of claim 11, wherein a random access procedure of the synchronization signal block comprises: a 2-step random access procedure or a 4-step random access procedure, wherein the random access process of the synchronization signal block comprises the 2-step random access process, and further comprises:

receiving a notification message via an MsgA transmitted by a PUSCH, wherein the random access process of the synchronization signal block comprises the 4-step random access process, and further comprises:

receiving a notification message via a PUSCH of Msg3, wherein the notification message comprises:

at least one of a transmission power value of the preamble, a positioning reference signal measurement result value or an identification information of the terminal device, wherein the positioning reference signal measurement result value comprises:

at least one of a signal strength measurement value, a time measurement value or an angle measurement value acquired by measuring the positioning reference signal received by the terminal device.

14. A network device, comprising:

at least one processor;

a transceiver connected to the at least one processor; and a memory for storing instructions executable by the at least one processor;

wherein the processor is configured to load and execute the executable instructions to implement the positioning method of claim 11.

15. A non-transitory computer-readable storage medium having stored therein executable instructions that, when loaded and executed by at least one processor, causes the at least one processor to implement the positioning method of claim 11.

16. A terminal device, comprising:

at least one processor;

a transceiver connected to the at least one processor; and a memory for storing instructions executable by the at least one processor;

wherein the at least one processor is configured to load and execute the executable instructions to implement a positioning method, comprising:

receiving a plurality of synchronization signal blocks from a network device;

determining a plurality of positioning random access resources corresponding to the plurality of synchronization signal blocks, wherein the positioning random access resources are random access resources for positioning; and sending at least one positioning reference signal according to the plurality of positioning random access resources;

wherein sending the at least one positioning reference signal according to the plurality of positioning random access resources comprises:

sending, with n random access channel resources corresponding to n positioning random access resources, n preambles corresponding to the n positioning random access resources, wherein n is an integer greater than or equal to 2;

wherein the synchronization signal blocks are from different transmission reception points (TRPs) of different cells, and the n preambles are sent to different TRPs of different cells; or the synchronization signal blocks are from different TRPs of a same cell, and the n preambles are sent to different TRPs of the same cell.

* * * * *